United States Patent [19]

Perricone

[11] Patent Number: 4,946,202
[45] Date of Patent: Aug. 7, 1990

[54] OFFSET COUPLING FOR ELECTRICAL CONDUIT

[76] Inventor: Vincent Perricone, 44 Tuttle Pl., East Haven, Conn. 06512

[21] Appl. No.: 339,140

[22] Filed: Apr. 14, 1989

[51] Int. Cl.⁵ .............................................. F16L 27/04
[52] U.S. Cl. .................................. 285/166; 285/184; 174/86; 29/428
[58] Field of Search ............... 285/184, 166, 907, 404; 174/86; 403/90; 29/469, 428

[56] References Cited

U.S. PATENT DOCUMENTS

| | | |
|---|---|---|
| 137,717 | 4/1873 | Prosser et al. . |
| 203,094 | 4/1878 | Wakeman . |
| 203,611 | 5/1878 | Graydon .......................... 285/166 |
| 508,006 | 11/1893 | Filstrup . |
| 675,106 | 5/1901 | Oberle ................................. 403/90 |
| 859,165 | 7/1907 | Boswell . |
| 871,757 | 11/1907 | Greenlaw . |
| 1,071,957 | 9/1913 | Rawson . |
| 1,451,800 | 4/1923 | Agner . |
| 1,460,697 | 7/1923 | Bendlin et al. .................. 285/166 X |
| 1,500,921 | 7/1924 | Bramson et al. ..................... 285/166 |
| 1,500,921 | 7/1924 | Bramson et al. . |
| 1,528,967 | 3/1925 | Bersted ........................... 285/166 X |
| 2,381,426 | 11/1942 | Allen et al. ............................ 285/91 |
| 3,433,504 | 3/1969 | Hanes ..................................... 285/93 |
| 3,695,646 | 10/1972 | Mommsen ........................... 285/261 |

*Primary Examiner*—Dave W. Arola
*Attorney, Agent, or Firm*—St. Onge Steward Johnston & Reens

[57] ABSTRACT

A coupling is provided for connecting between an electrical conduit and an electrical device for enclosing electrical wires passing therebetween, when the conduit and the device are laterally offset as well as spaced apart from each other. The coupling comprises at least first, second, and third hollow tubular members extending along first, second, and third axes respectively and joined end to end by at least a pair of ball and socket joints to form a unitary structure having relatively smooth interior walls forming a passageway for accommodating passage of electrical wires therethrough.

The joints are angularly adjustable in any plane aligned with said second axis to permit alignment of said first, second, and third axes not only in coalignment with each other, but also said first and third axes displaced one from the other by an offset distance corresponding to said lateral offset.

20 Claims, 3 Drawing Sheets

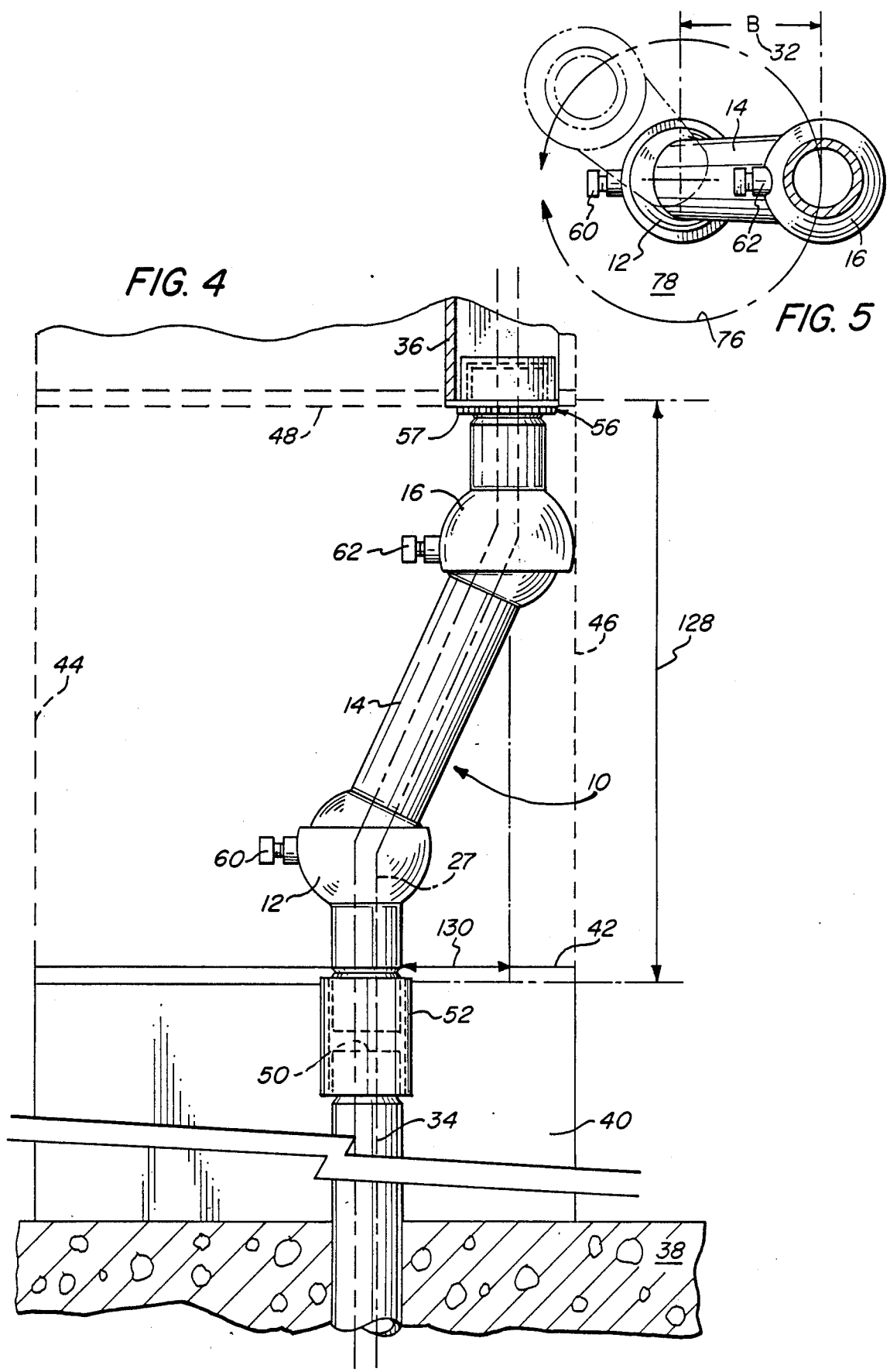

OFFSET COUPLING FOR ELECTRICAL CONDUIT

I. FIELD OF THE INVENTION

An offset coupling is provided for use between an electrical conduit and an electrical device such as an electrical box. More specifically, a coupling for connecting an electrical conduit to an electrical device is provided for enclosing electrical wires or cables passing therebetween, where said conduit and said device may be offset with respect to each other.

II. BACKGROUND OF THE INVENTION

Electricians routinely encounter the problem of running a length of connector pipe from a terminated conduit or stub-up in a floor to an electrical box to be mounted in a wall in the process of being built upwards from the floor, which box will typically be laterally offset from and not in adequate perpendicular alignment with the stub-up or parallel to a masonry wall face. The box is often aligned at a predetermined set back distance from the wall face to be built, and the electrician then encounters the problem of running the pipe to the box. The offset may be accommodated in several ways, the most typical being to bend the stubbed up pipe to adequately align with the box for running a fairly straight connector pipe therebetween. Or, the length of connector pipe itself, which is joined to both the conduit and the box by routine couplings well known in the art, may be appropriately bent to match the offset.

However, bending of the stub-up is crude and can be a problem, particularly if the stub-up is close to the floor and perhaps recessed or inside a wall line. It can be difficult to get a pipe bending tool, which is likely four or five feet long, into a close space to accomplish the bending operation. It may even be necessary to remove some of the wall, which removal is time consuming and expensive.

Also, if the stub-up or the connector pipe is bent improperly, such as at too sharp an angle, it may narrow the pipe's interior diameter and make pulling wires therethrough difficult. In addition to bending, pipes may be wedged into a particular alignment with masonry chips, which is a crude technique that can lead to sloppy results.

III. SUMMARY OF THE PRESENT INVENTION

The coupling of one preferred embodiment of the present invention is a hollow, generally dumbbell-shaped coupling comprising of three hollow tubular members joined together end to end by a pair of hollow ball and socket joints to form a unitary structure with two free ends, one each for the conduit and the box to provide a relatively smooth passageway for conveying the electrical wires therebetween. The ball and socket joints provide for universal motion of the hollow tubular members with respect to each other, so that the two free ends can be positioned offset with respect to each other to match the offset between the box and the conduit. Set screws are mounted in each ball and socket joint for lockingly retaining said free ends in their selected positions.

It is an object of the present invention to provide an angularly adjustable coupling that can be adjusted to accommodate an offset without bending or narrowing of the passageway through which the wires must travel.

It is a further object of the present invention to provide an adjustable offset coupling that can be adjusted primarily by a screwdriver without need for a bending tool.

It is a further object of the present invention to provide an adjustable offset coupling that can be made in different sizes to accommodate different size electrical conduit pipes.

It is a further object of the present invention to provide an adjustable offset coupling that permits a worker such as a mason to adjust necessary offsets or distance from a wall face by a simple tool such as a screwdriver, even after a masonry wall has been partially constructed.

Further objects and advantages of the present invention will become apparent from the following description of the drawings and the preferred embodiments.

IV. BRIEF DESCRIPTION OF THE DRAWINGS

FIG. 4 is a side view of the coupling of the present invention as installed in a masonry wall; and FIG. 5 is a top view of the coupling of the present invention.

V. DETAILED DESCRIPTION OF THE PREFERRED EMBODIMENT

Figure 1:
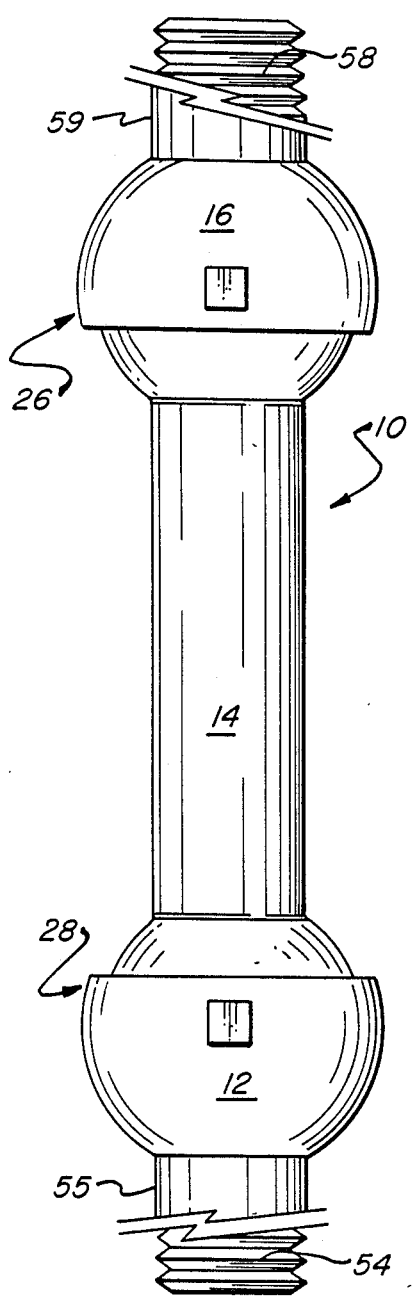
FIG. 1 is a side view of the offset coupling of the present invention.

With reference to FIGS. 1, 2, 3, 4, and 5, the coupling of the present invention is indicated generally at 10. Coupling 10 includes first, second, and third hollow, relatively rigid tubular members 12, 14, and 16 preferably formed from galvanized steel or other likewise suitable material and extending along their respective first, second, and third axes 18, 20, and 22. The three tubular members when joined form a hollow passageway 24 therethrough having relatively smooth interior walls 25 for passing electrical wires therethrough as indicated in phantom at 27 in FIG. 4. The three members 12, 14, and 16 are joined in end-to-end fashion by a pair of ball and socket joints 26 and 28 to form unitary structure 10. It can be seen from FIG. 2 that there are no sharp transition points along passageway 24 on which electrical wires or cables being pulled therethrough might snag or be torn, as will be further described in detail below. Also, as further disclosed below, the rotation of said ball and socket joints is limited such that no sharp interior corners or surfaces are created for snagging wires. There is one ball and socket joint 28 between first and second tubular members 12 and 14, and another ball and socket joint 26 between second and third tubular members 14 and 16.

Figure 2:
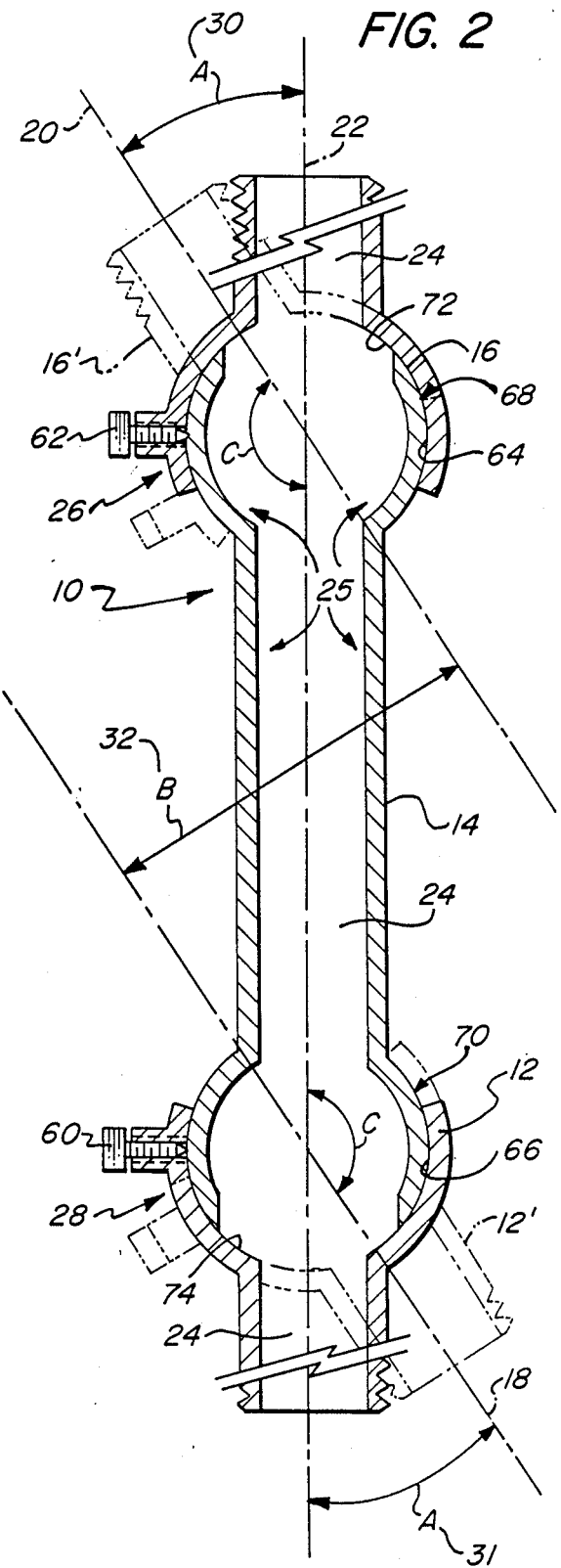
FIG. 2 is a cross-section of the view of FIG. 1.

It can be readily appreciated from FIG. 2 that ball and socket joints 26 and 28 are angularly adjustable, such as is shown for example with respect to tubular members 12 and 16 and in phantom at 12, and 16, in an angled position of angle A at 30, such that third axis 20 now forms angle A with second axis 22 and first axis 18 also forms angle A at 31 with axis 22. It is further appreciated that, since ball and socket joints 26 and 28 are spherical, the angular adjustment from 0° to A can be accomplished in any plane through which second axis 22 passes. The ball and socket joints permit universal movement of the respective members, said movement being restricted to limit obtuse angle C to no less than approximately 155° to thereby avoid too sharp a bend in the passageway for accommodating cables or wires therethrough.

Accordingly, the first, second, and third axes 18, 20, and 22 can be aligned to be coincident with each other as in FIG. 2, or the first and third axis can be parallel to each other but at an angle A to the second axis 22 as is shown in phantom in FIG. 2. As shown in phantom, the axes 18 and 20 are displaced laterally from each other by offset distance B at 32, which offset distance B corresponds to the magnitude of the offset that can be accommodated between conduit 34 and box 36 as shown in FIG. 4. Conduit 34 is stubbed up through concrete floor 38 and inside hollow block 40, but below block rim 42. Dotted lines 44, 46, and 48 indicate the outlines of the completed wall to be built after installation of coupling 10 and positioning of the box 36.

Conduit 34 is coupled at its terminus 50 to member 12 by means of a standard sleeve coupling 52 threaded onto conduit 34 and also onto threaded portion 54 (see FIG. 1) of member 12. Likewise, box 36 is coupled by means of a standard lock ring 57 threaded onto threaded portion 58 (see FIG. 1).

Set screws 60 and 62 provide means for securing joints 26 and 28 in a fixed angular orientation corresponding to an offset distance such as B. Each set screw includes an elongated threaded bolt such as at 84 extending along a bolt axis 86 and mounted in a correspondingly threaded bore 88. Bolt 84 has a tip 90 opposite bolt head 92 for abutting the radially outward ball shaped surface 70 in a frictionally engaging manner to maintain a selected angular orientation such as A after bolt 84 is rotated about axis 86 to move inwardly and engage surface 70. The bolt 84 can also be backed off and retightened to permit selection of a new angle A. In the preferred embodiment, bolt 84 is a square head core point set screw.

Second tubular member 14 is integrally formed at both ends thereof with spherically shaped surfaces 64 and 66 for slidingly mating on the radially outward surfaces 68 and 70 thereof in a concentric relationship with correspondingly shaped spherical surfaces 72 and 74 respectively integrally formed in one end of each of said first and third tubular members 12 and 16 for likewise slidingly mating on the radially inward side to provide a continuum of angular rotation between a first angle of 0° and a second angle A in any plane through which second axis 22 passes. The free end of either or both of the first and third members 12 and 16 are positionable to any point within a circle 76 (see FIG. 5) lying in a plane 78 perpendicular to second axis 22. The diameter of circle 76 is at least as great as the magnitude of offset B. The interiors 80 and 82 of said spherically shaped ends of second tubular member 14 are also spherical. Joints 26 and 28 are therefor substantially unobstructed hollow globes regardless of the angular positioning A and are essentially spherical in shape both inside and outside.

Figure 3:
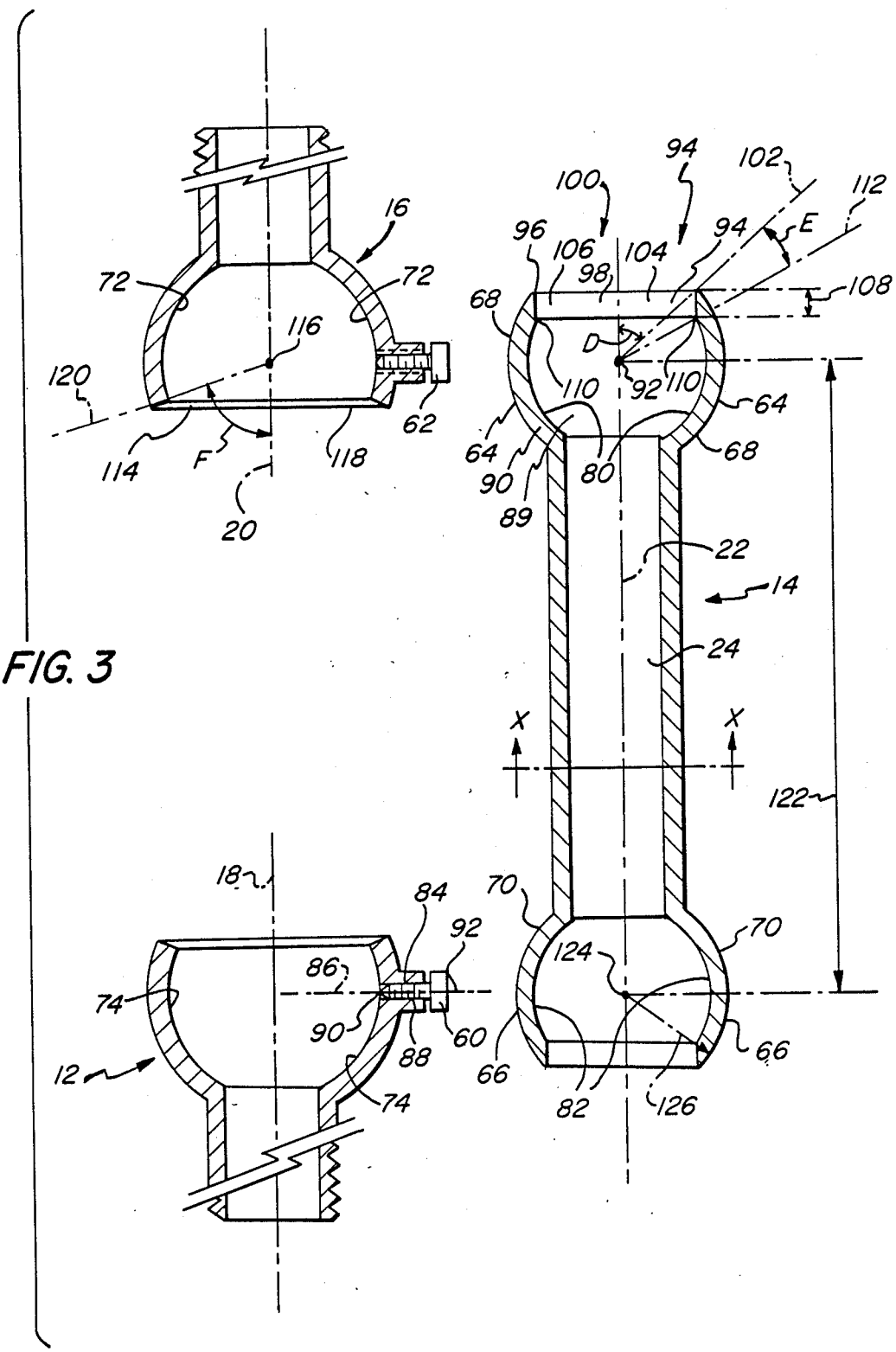
FIG. 3 is an exploded view of the view of FIG. 2.

With reference now to FIG. 3, center length 14 is generally cylindrical in cross section x-y along cylinder axis 22 extending along passageway 24. Each ball-shaped end such as 89 corresponds to a ball 90 formed about a ball center point 92 lying along axis 22 adjacent end 94 of said length 14. A section of ball 90 is thoroughly removed at 94 to form a rim 96 corresponding to a circular curve 98 on said ball in a plane normal to axis 22 to form a circular aperture 100 defined by rim 96 through which wires or cables such as at 27 may pass into said remaining lengths such as 12 or 16. A straight line 102 extending between ball center point 92 to rim 96 preferably forms an angle D of about 45° with axis 22 on the side 104 of said cylinder axis 22 toward aperture 100, although angle D can of course be varied to provide a suitably sized rim, so long as rim 96 is restricted from being rotated to such a degree as to extend into the passageway 24 formed in length 16 as shown in FIG. 2.

Rim 96 has associated therewith a taper 106 corresponding to a cylindrically shaped interior surface corresponding to 106 and extending parallel to cylindrical axis 22 from said rim 96 inwardly into the ball-shaped end. Taper 106 has a substantially uniform predetermined width 108 around aperture 100 between rim 96 and an inner edge 110 of shaped surface 106. Accordingly, a second straight line 112 drawn from ball center 92 to said inner edge 110 with this second line 112 being in the same plane as first said line preferably forms an angle E of preferably about 18° with first line 102, although angle E can be varied to provide a taper of other suitable lengths.

Each socket such as at 16 has a generally concentric ball shape corresponding to ball-shaped end such as 89. This socket has an opening 114 for receiving ball-shaped end 89 therein. This socket at 16 is formed about a concentric ball centerpoint 116 lying on longitudinal axis 20 extending through the associated remaining length of 16. Opening 114 has a perimeter 118 corresponding to the intersection with the concentric ball of a line of rotation 120 being rotated 360° about longitudinal axis 20. Line of rotation 120 extends from said concentric ball centerpoint 116 radially outwardly towards opening 114 at an angle F of preferably about 75° with respect to axis 20 for the preferred embodiment disclosed here, although angle F can of course be varied to accommodate other sized ball-shaped ends.

The distance 122 between ball centerpoints 92 and 124 is in the preferred embodiment substantially about 4.75 inches. The ball-shaped ends have a preferred outer diameter 126 of about 1.50 inches. The diameters and lengths of the tubular members and ball-shaped ends can of course be varied depending upon the size of the wires to be passed therethrough.

The coupling 10 of the present invention is useful in a method of connecting an electrical conduit such as 34 to an electrical box such as 36 for enclosing electrical wires 27 passing therebetween. Conduit 34 is separated from box 36 in at least first and second directions 128 and 130, such as for example vertically and laterally as shown in FIG. 4. Directions 128 and 130 are mutually perpendicular. The method comprising the steps of connecting one of two opposing terminal ends such as 59 of coupling 10 forming a passageway 24 therethrough to either said conduit or said box, such that passageway 24 is in communication with either said conduit or box to which said terminal end 59 is connected. Each ball and socket joint 26 and 28 is rotatably adjusted until the other one of said opposing terminal ends 55 is aligned with either the remaining conduit or box in both said first and second directions 128 and 130. The other one of said opposing terminal end 55 is connected to said remaining conduit or box, and each said ball and socket joint is lockingly maintained in the corresponding rotatably adjusted position. In this manner a relatively rigid passageway 24 is provided between said conduit 34 and said box 36 for conveying electrical cables 27 therebetween.

The connecting step includes threading threaded portions 54 and 56 of each of said end legs 12 and 16 into engagement with correspondingly threaded members associated with said conduit and said box accordingly, and the rotatably adjusting step includes rotating each said ball with each said socket of said ball and socket joint to properly align said threaded portions with both said conduit and said box.

The lockingly maintaining step includes rotating set screw means mounted in said socket into engagement with an outer surface of said ball for each ball and socket joint.

It is understood that the dimensions, such as for example lengths, diameters, and angles, are illustrative of one preferred embodiment of this invention and that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A coupling for connecting between an electrical conduit and an electrical device for enclosing electrical wires passing therebetween, said conduit and device being laterally offset as well as spaced apart from each other, said coupling comprising:
   (a) at least first, second, and third hollow tubular members extending along first, second, and third axes respectively and joined end to end by at least a pair of joint means to form a unitary structure having relatively smooth interior wall forming a substantially unobstructed passageway suitable for accommodating passage of electrical wires therethrough, there being one joint means between said first and second tubular members and another joint means between said second and third tubular members, said joint means being angularly adjustable in any plane aligned with said second axis to permit alignment of said first, second, and third axes not only in coalignment with each other, but also said first and third axes displaced one from the other by an offset distance corresponding to said lateral offset;
   (b) means for coupling free ends of said first and third tubular members to said conduit and said device respectively to form said passageway therebetween for enclosing said electrical wires therein; and
   (c) means associated with each joint means for securing each said joint means in a fixed angular orientation corresponding to said offset.

2. The coupling of claim 1, wherein each said joint means includes a hollow ball and socket joint permitting universal movement of conjoined members at said joint, said movement being restricted to limit an obtuse angle between said first and second axes, and also said third and second tubular axes, to no less than approximately 155°.

3. The coupling of claim 1, wherein the second tubular member is integrally formed at both ends thereof with a spherically shaped surface for slidingly mating on the radially outward side thereof in a concentric relationship with a correspondingly shaped spherical surface integrally formed in one end of each of said first and third tubular members for likewise slidingly mating on the radially inward side to provide a continuum of angular rotation between first and second angles in any said plane, said free end of at least one of said first and third members being positonable to any point within a circle lying in at least one plane substantially perpendicular to said second axis, the diameter of said circle being at least as great as the magnitude of said offset, the interior of said spherically shaped ends of said second tubular member also being spherical and said joint means being substantially an substantially unobstructed hollow globe regardless of angular positioning of said members, said joint means being essentially spherical in shape both inside and outside.

4. The coupling of claim 3, wherein said coupling means include threaded portions formed on each free end of said first and third tubular members.

5. The coupling of claim 4, wherein said securing means include set screw means.

6. The coupling of claim 5, wherein each said tubular member is formed from galvanized steel.

7. An angularly adjustable electrical conduit member for enclosing cables passing from a conduit terminus to a receiving port associated with an electrical means, wherein said port may be displaced in a direction transverse to said conduit, said member comprising:
   (a) three lengths of relatively rigid tubular piping joined end to end, one such length being a center length joined in between the two remaining lengths, each length having cores formed lengthwise therein with cooperating substantially unobstructed passageways suitable for admitting said cables therethrough;
   (b) two ball and socket joint combinations for joining said lengths together, one such combination being associated with each opposing end of said center length, the opposing ends of said center length each being ball-shaped and nested at both ends within correspondingly shaped sockets, one such socket being formed in an end of each of the remaining lengths, for universal movement of each said ball-shaped end within tis corresponding socket to provide an adjustable angular relationship between said center length and each remaining length, each remaining length also having means formed in the end opposite said socket for mating with said conduit and at a corresponding end of said other remaining member with said port; and
   (c) means mounted in each said socket for maintaining said adjustable angular relationship between said center length and both said remaining lengths, whereby said tubular lengths can be angularly adjusted with respect to each other to form a relatively rigid connection appropriately shaped to match a transverse displacement between said conduit terminus and said port.

8. The member of claim 7, wherein said mating means comprises at least one screw threaded portion.

9. The member of claim 8, wherein said adjustable angular relationship maintaining means comprises elongated threaded bolt means extending along a bolt axis, said bolt means being mounted in a correspondingly threaded bore in said socket, said bolt means having a tip opposite a bolt head, said tip for abutting said ball-shaped surface in a frictionally engaging manner to maintain a selected angular relationship after said bolt head is rotated about said bolt axis in a preselected direction.

10. The member of claim 9, wherein said tip is further disengageable by rotating said bolt head in an opposite direction to back said tip away from said ball-shaped end, said member being readjustable to a new angular relationship which can be thereafter maintained by rotating said bolt in said preselected direction to engage said tip against said ball-shaped end.

11. The member of claim 10, wherein said bolt means is a square head core point set screw.

12. The member of claim 7, wherein said center length is generally cylindrical in cross section along a cylinder axis extending along said passageway, and each said ball-shaped end corresponds to a ball formed about respective ball center points lying along said cylinder axis adjacent each opposing end of said center length, a section of each said ball at each said opposing end being thoroughly removed to form a rim corresponding to a circular curve on said ball in a plane substantially normal to said cylinder axis to for a circular aperture defined by said rim through which said wires may pass into said remaining lengths, and a straight line extending between either of said ball center points to the associated rim forms an angle of about 45° degrees with said cylinder axis on the side of said cylinder axis toward said aperture, said rim being restricted from being rotated to such a degree with respect to said remaining lengths as to extend into the passageway formed in said remaining lengths.

13. The member of claim 12, wherein said rim has associated therewith a taper formed by a cylindrically shaped interior surface extending parallel to said cylindrical axis from said rim inwardly into said ball-shaped end, said taper having a substantially uniform predetermined width around said aperture between said rim and an inner edge of said shaped surface, such that a second straight line drawn from said ball center to said inner edge with said second line being in the same plane as first said line forms an angle of about 18° with first said line.

14. The member of claim 13, wherein each said socket has a generally concentric ball shape corresponding to said ball-shaped end, said socket having an opening for receiving said ball-shaped end therein, said concentric ball being formed about a concentric ball centerpoint lying on a longitudinal axis extending through the associated remaining length, said opening having a perimeter corresponding to the intersection with said concentric ball of a line of rotation being rotated 360° about said longitudinal axis, said line of rotation extending from said concentric ball centerpoint radially outwardly towards said opening at an angle of about 65° with respect to said longitudinal axis.

15. The member of claim 14, wherein each said socket when mounted on its assoCiated ball-shaped end is angularly adjustable in any plane passing through said cylinder axis by rotating said socket with respect to said ball about said concentric ball centerpoint, which also corresponds to said ball centerpoint, to form any angle in the range of from about 155° to 180° between said cylinder axis and said longitudinal axis.

16. The member of claim 15, wherein the distance between ball centerpoints on said center length is substantially about 4.75 inches, and said ball-shaped ends have an outer spherical surface for providing a spherical bearing surface for said socket, said ball-shaped ends further having an outer diameter of approximately 1.50".

17. A method of connecting an electrical conduit to an electrical box for enclosing electrical wires passing therebetween, said conduit being separated from said box in at least first and second directions, said directions being mutually perpendicular, said method comprising the steps of:

(a) connecting one of two opposing terminal ends of a three leg hollow coupling forming a substantially unobstructed passageway therethrough to either said conduit or said box, such that said passageway is in communication with either said conduit or box to which said terminal end is connected, each said leg being elongated, said three legs being joined end to end by a pair of hollow ball and socket joints, there being one leg in the middle between the two end legs forming said opposing terminal ends;

(b) rotatably adjusting each said ball and socket joint until the other one of said opposing terminal ends is aligned with either the remaining conduit or box in both said first and second directions;

(c) connecting said other one of said opposing terminal ends to said remaining conduit or box; and (d) lockingly maintaining each said ball and socket joint in the corresponding rotatably adjusted position; whereby a relatively rigid substantially unobstructed passageway is provided between said conduit and said box for conveying said electrical wires therebetween.

18. The method of claim 17, wherein said connecting steps include threading threaded portions of each of said end legs into engagement with correspondingly threaded members associated with said conduit and said box accordingly.

19. The method of claim 18, wherein said rotatably adjusting step includes rotating each said ball with each said socket of said ball and socket joint to properly align said threaded portions with both said conduit and said box.

20. The method of claim 19, wherein said lockingly maintaining step includes rotating set screw means mounted in said socket into engagement with an outer surface of said ball for each ball and socket joint.

* * * * *